United States Patent
Jeon et al.

(10) Patent No.: US 10,196,765 B2
(45) Date of Patent: Feb. 5, 2019

(54) HYBRID TIRE CORD AND METHOD FOR MANUFACTURING THE SAME

(71) Applicant: KOLON INDUSTRIES, INC., Gwacheon-si, Gyeonggi-do (KR)

(72) Inventors: Ok Wha Jeon, Yongin-si (KR); Min Ho Lee, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 15/393,591

(22) Filed: Dec. 29, 2016

(65) Prior Publication Data

US 2017/0106698 A1 Apr. 20, 2017

Related U.S. Application Data

(63) Continuation of application No. 15/194,741, filed on Jun. 28, 2016, now Pat. No. 9,617,663.

(30) Foreign Application Priority Data

Jun. 29, 2015 (KR) ........................ 10-2015-0092016

(51) Int. Cl.
| | |
|---|---|
| D02G 3/48 | (2006.01) |
| D02G 3/04 | (2006.01) |
| D02G 3/40 | (2006.01) |
| D01H 13/00 | (2006.01) |
| B60C 9/00 | (2006.01) |
| B29D 30/38 | (2006.01) |
| B29D 30/70 | (2006.01) |

(52) U.S. Cl.
CPC .............. *D02G 3/48* (2013.01); *B29D 30/38* (2013.01); *B29D 30/70* (2013.01); *B60C 9/005* (2013.01); *B60C 9/0042* (2013.01); *D01H 13/00* (2013.01); *D02G 3/045* (2013.01); *D02G 3/047* (2013.01); *D02G 3/40* (2013.01); *B60C 2009/0035* (2013.01); *B60C 2009/0071* (2013.01); *B60C 2009/0085* (2013.01); *B60C 2009/0092* (2013.01)

(58) Field of Classification Search
CPC ........ D02G 3/045; D02G 3/047; D02G 3/404; D02G 3/48
See application file for complete search history.

(56) References Cited

U.S. PATENT DOCUMENTS

| | | | |
|---|---|---|---|
| 4,155,394 A | 5/1979 | Shepherd et al. | |
| 4,877,073 A | 10/1989 | Thise et al. | |
| 9,175,425 B2 | 11/2015 | Love et al. | |
| 2009/0090447 A1* | 4/2009 | Baldwin, Jr. | B60C 9/0042 |
| | | | 152/451 |
| 2013/0025758 A1 | 1/2013 | Kim et al. | |
| 2013/0167503 A1 | 7/2013 | Han et al. | |
| 2014/0237983 A1 | 8/2014 | Love et al. | |
| 2014/0238524 A1 | 8/2014 | Love et al. | |
| 2015/0292124 A1 | 10/2015 | Lee et al. | |

FOREIGN PATENT DOCUMENTS

| | | |
|---|---|---|
| JP | 2008-106405 | 5/2008 |
| KR | 10-2006-0126101 A | 12/2006 |
| KR | 10-1260390 B1 | 5/2013 |
| KR | 10-1411209 B1 | 6/2014 |
| KR | 10-2014-0090307 A | 7/2014 |

OTHER PUBLICATIONS

International Searching Authority, International Search Report dated Oct. 19, 2016 in Application No. PCT/KR2016/006942.
European Patent Office, Communication dated Nov. 22, 2016 in counterpart European Patent Application No. 161763313.

* cited by examiner

*Primary Examiner* — Shaun R Hurley
(74) *Attorney, Agent, or Firm* — Sughrue Mion, PLLC

(57) ABSTRACT

A hybrid tire cord has more uniform physical properties, and improved strength and fatigue resistance. The hybrid tire cord can easily be manufactured. The hybrid tire cord includes a nylon primarily twisted yarn and an aramid primarily twisted yarn, wherein the nylon primarily twisted yarn and the aramid primarily twisted yarn are secondarily twisted together, and after untwisting of the secondary twisting of the hybrid tire cord having a predetermined length, a length of the aramid primarily twisted yarn is 1.005 to 1.025 times a length of the nylon primarily twisted yarn.

6 Claims, No Drawings

HYBRID TIRE CORD AND METHOD FOR MANUFACTURING THE SAME

CROSS REFERENCE TO RELATED APPLICATIONS

This application is a continuation of U.S. application Ser. No. 15/194,741 filed Jun. 28, 2016, which claims the priority from Korean Application No. 10-2015-0092016, filed on Jun. 29, 2015 in the Korean Patent Office, the disclosures of which are incorporated herein by reference in their entireties.

TECHNICAL FIELD

The present invention relates to a hybrid tire cord including heterogeneous yarns having different physical properties and a method for manufacturing the same. More specifically, the present invention relates to a hybrid tire cord which can be easily manufactured and has more uniform physical properties, and improved strength and fatigue resistance and a method for manufacturing the same.

BACKGROUND ART

Tire cords, especially, tire cords treated with an adhesive agent, referred to as "dip cords", are widely used as reinforcing materials of rubber products such as tires, conveyor belts, V-belts and hoses and materials for tire cords include nylon fibers, polyester fibers, rayon fibers and the like. One of essential methods of improving performance of final rubber products is to improve physical properties of tire cords used as reinforcing materials.

Improved vehicle performance and road conditions have brought about gradually increasing vehicle driving speed. Accordingly, a great deal of research is underway on tire cords capable of maintaining stability and durability of tires even during high-speed driving.

A tire cord is classified depending on used part and rule and is divided into a carcass for entirely supporting the tire, a belt for supporting load upon high-speed driving and a cap ply for preventing deformation of the belt. Recently, improved highway conditions have resulted in increased vehicle speeds, causing problems such as deformation of the belt of the tire and deterioration in drive comfort. For this reason, importance of a cap ply to prevent deformation of the belt is increasing.

Major materials for currently used tire cords for cap ply are nylon and aramid. Of them, nylon is applied to most tires due to low cost, superior adhesivity and superior fatigue resistance as compared to other materials. In addition, nylon has a high compressive stress which is advantageous for preventing deformation of belts during high-speed driving. However, nylon has a problem of causing flat spots due to low modulus and great deformation with variation in temperature.

Aramid used as another material for the cap ply, in addition to the nylon, has almost no flat spot phenomenon in which a tire is deformed upon parking for a long time due to very high modulus and less change in modulus at room temperature and high temperature and is thus generally for high-quality tire essentially requiring high quality. However, aramid is inapplicable to general-purpose tires because it is very expensive. In addition, aramid has drawbacks of relative difficulty in tire molding due to high modulus, and low fatigue resistance and durability due to low breaking elongation.

In order to solve the aforementioned problems of nylon and aramid, a hybrid cord to which both nylon and aramid are applied has been developed. In particular, a hybrid cord having a structure in which a nylon primarily twisted yarn is covered with an aramid primarily twisted yarn (hereinafter, "covering structure") has been developed.

Typically, in order to allow the aramid primarily twisted yarn and the nylon primarily twisted yarn to be simultaneously broken, the aramid filament yarn having a higher modulus is primarily twisted at a greater twist number as compared to the nylon filament yarn having a lower modulus and, in order to prevent aggregation between primarily twisted yarns during secondary twisting, the aramid filament yarn and the nylon filament yarn are primarily twisted in different directions. For example, an aramid primarily twisted yarn is produced by primarily twisting the aramid filament yarn at a high twist number in an S-direction, a nylon primarily twisted yarn is produced by primarily twisting the nylon filament yarn at a low twist number in a Z-direction, and a 2-ply yarn having a covering structure is produced by secondarily twisting the aramid primarily twisted yarn and the nylon primarily twisted yarn at a low twist number in an S-direction.

The 2-ply yarn having a covering structure described above has drawbacks of low production efficiency and high manufacturing cost because it is produced by a three-step process using a ring twister (that is, a first step of primarily twisting an aramid filament yarn to form an aramid primarily twisted yarn, a second step of primarily twisting a nylon filament yarn to form a nylon primarily twisted yarn, and a third step of secondarily twisting the aramid primarily twisted yarn and the nylon primarily twisted yarn).

In addition, there are problems of high deviation in physical properties and increased defect rate in the manufacture of the hybrid cord, because the aramid primarily twisted yarn for covering the nylon primarily twisted yarn is pulled by friction with a guide or roller to form a roof, or the nylon primarily twisted yarn is compressed, thus causing shape non-uniformity, during drying and thermal treatment after dipping the 2-ply yarn having a covering structure in an adhesive agent solution.

In addition, because the aramid filament yarn is primarily twisted at a higher twist number as compared to the nylon filament yarn in order to minimize the difference in physical properties between nylon and aramid, strength of the aramid filament yarn is greatly deteriorated and the advantage, i.e., high modulus, of the aramid cannot be secured. As a result, the hybrid cord having a covering structure inevitably has low strength as expected and thus has a relatively high risk of tire deformation during high-speed driving.

In order to solve the aforementioned disadvantages of the hybrid cord having a covering structure, Korean Patent Laid-open No. 10-2014-0090307, registered to the present applicant, suggests a hybrid cord having a merge structure which is produced by secondarily twisting a nylon primarily twisted yarn and an aramid primarily twisted yarn, which have been primarily twisted in the same direction, in a direction opposite to the direction, wherein secondary twisting is conducted such that the nylon and aramid primarily twisted yarns have an identical structure.

However, in the case of a hybrid cord having a merge structure, stress is intensely applied to the aramid primarily twisted yarn upon repeated tension and compression of tires, thus inevitably causing low fatigue resistance of tire cord and, disadvantageously, resulting in impossibility of securing safety of tires during long-term high-speed driving.

DISCLOSURE

Technical Problem

Therefore, the present invention has been made in view of the problems resulting from limitations and drawbacks of the related art and provides a hybrid tire cord and a method for manufacturing the same.

It is one aspect of the present invention to provide a hybrid tire cord which can be easily manufactured and is applicable to ultra-high performance tires due to high strength and fatigue resistance.

It is another aspect of the present invention to provide a method of manufacturing a hybrid tire cord, which is applicable to ultra-high performance tires due to high strength and fatigue resistance, at high production efficiency and low cost, while minimizing deviation in physical properties.

The aspects of the present invention as described above as well as other features and advantages of the present invention will be described in the following or will be clearly understood by those skilled in the art from the description. The aspects and other advantages of the present invention can be implemented and accomplished by configurations specified in the Detailed Description of the Invention and Claims.

Technical Solution

In accordance with an aspect of the present invention, the above and other objects can be accomplished by the provision of a hybrid tire cord including a nylon primarily twisted yarn, and an aramid primarily twisted yarn, wherein the nylon primarily twisted yarn and the aramid primarily twisted yarn are secondarily twisted together, and after untwisting (post-untwist) of the secondary twisting of the hybrid tire cord having a predetermined length, a length of the aramid primarily twisted yarn is 1.005 to 1.025 times a length of the nylon primarily twisted yarn.

The nylon primarily twisted yarn may have a first twist direction, the aramid primarily twisted yarn may have a second twist direction, the nylon primarily twisted yarn and the aramid primarily twisted yarn may be secondarily twisted together in a third twist direction, the second twist direction may be the same as the first twist direction, and the third twist direction may be opposite to the first twist direction.

The aramid primarily twisted yarn may have a lower twist number than a twist number of the nylon primarily twisted yarn.

The aramid primarily twisted yarn may have a 0.1 to 5% lower twist number than a twist number of the nylon primarily twisted yarn.

A weight ratio of the nylon primarily twisted yarn to the aramid primarily twisted yarn may be 20:80 to 80:20.

The hybrid tire cord may further include an adhesive agent coated on the nylon primarily twisted yarn and the aramid primarily twisted yarn, wherein strength at break and elongation at break measured by ASTM D885 are 8.0 to 15.0 g/d and 7 to 15%, respectively, the twist number of the aramid primarily twisted yarn is 0.1 to 5% lower than the twist number of the nylon primarily twisted yarn, based on 100, the twist number of the nylon primarily twisted yarn, and a strength maintenance percentage after disk fatigue test conducted by JIS-L 1017 of Japanese Standard Association (JSA) is 90% or higher.

The hybrid tire cord may have 3% LASE, 5% LASE, and 7% LASE measured by ASTM D885, of 0.8 to 2.0 g/d, 1.5 to 4.0 g/d, and 3.0 to 6.0 g/d, respectively.

The hybrid tire cord may have a shrinkage of 1.5 to 2.5%, wherein the shrinkage is measured under a primary load of 0.01 g/denier at 180° C. for 2 minutes.

In another aspect of the present invention, provided is a method of manufacturing a hybrid tire cord including: a first step of primarily twisting an aramid filament yarn in a first direction to form an aramid primarily twisted yarn; a second step of primarily twisting a nylon filament yarn in a second direction to form a nylon primarily twisted yarn, the second step and the first step being conducted simultaneously, and a third step of secondarily twisting the aramid primarily twisted yarn and the nylon primarily twisted yarn in a third direction to form a plied yarn, the third step being conducted continuously with the first and second steps, wherein the first, second and third steps are conducted by one twister, the second direction is the same as the first direction, the third direction is opposite to the first direction, tension applied to the nylon filament yarn in the second step is higher than tension applied to the aramid filament yarn in the first step, and the tension applied to the nylon filament yarn in the second step is higher than the tension applied to the aramid filament yarn in the first step in such an amount that the aramid primarily twisted yarn is 1.005 to 1.025 times longer than the nylon primarily twisted yarn after untwisting of the secondary twist of the hybrid tire cord with a predetermined length.

The method may further include dipping the plied yarn in an adhesive agent solution, drying the adhesive agent solution-impregnated plied yarn, and thermally treating the dried plied yarn.

The dipping, drying and thermal treatment steps may be continuously conducted, and tension applied to the plied yarn in the dipping, drying and thermal treatment steps may be 0.4 g/d or less per cord.

General description related to the present invention given above serves to illustrate or disclose the present invention and should not be construed as limiting the scope of the present invention.

Effects of the Invention

According to the present invention, secondary twisting and primary twisting are conducted in one twister, thereby improving production efficiency of the hybrid tire cord and reducing manufacturing costs thereof.

In addition, the twist number of the primary twisting of the aramid filament yarn is much lower than the twist number of aramid primary twisting in the covering structure of the prior art, thereby greatly reducing deterioration in strength of aramid. That is, in manufacture of the hybrid tire cord, relatively high strength of aramid can be maintained, and the hybrid tire cord of the present invention can minimize tire deformation during high-speed driving owing to high strength of aramid.

In addition, the hybrid tire cord of the present invention has a stable structure in which the aramid primarily twisted yarn and nylon primarily twisted yarn are twisted in a substantially identical ratio, thereby minimizing deviation in physical properties and defect rate which may be caused in the manufacturing process, as compared to the prior art associated with a covering structure.

In addition, according to the present invention, after untwisting the cord, the length of aramid primarily twisted yarn is 1.005 to 1.025 times the length of nylon primarily twisted yarn, thereby dispersing stress applied to the hybrid tire cord during repetition of tension/compression of the tire to the aramid primarily twisted yarn as well as the nylon primarily twisted yarn. Consequently, the hybrid tire cord of the present invention having superior fatigue resistance can maintain stability of tires even during long-term high-speed driving. In particular, difference in fatigue resistance occurs when tension/compression deformation is serious, and difference in fatigue resistance is further increased when tension/compression/shearing is repeatedly applied upon actual tire driving.

BEST MODE

Hereinafter, embodiments of the hybrid tire cord of the present invention and a method for manufacturing the same will be described in detail with reference to the annexed drawings.

Those skilled in the art will appreciate that various modifications, additions and substitutions are possible, without departing from the scope and spirit of the invention as disclosed in the accompanying claims. Accordingly, the present invention includes modifications and alterations which fall within the scope of the inventions as claimed and equivalents thereto.

The term "primarily twisted yarn" as used herein refers to a single yarn made by twisting one filament yarn in one direction.

The term "plied yarn" as used herein refers to a yarn made by twisting two or more primarily twisted yarns together in one direction, which is also called a "raw cord".

The term "tire cord" as used herein includes the "raw cord" as well as "dip cord" which means a plied yarn containing an adhesive agent so that it can be directly applied to rubber products. An adhesive agent-containing fabric which is produced by spinning plied yarns, making a fabric with the yarns and then dipping the fabric in an adhesive agent solution is also included in the tire cord.

The term "twist number" used herein means the number of twists per one meter and its unit is TPM (twist per meter).

The tire cord according to the present invention is a hybrid type of nylon and aramid, which includes a first twist direction of nylon primarily twisted yarns and a second twist direction of aramid primarily twisted yarns wherein the nylon primarily twisted yarns and the aramid primarily twisted yarns are together secondarily twisted in a third twist direction.

The nylon filament yarns and the aramid filament yarns are simultaneously respectively primarily twisted in one twister (for example, a cable cord twister), thereby forming the nylon primarily twisted yarn and the aramid primarily twisted yarn. For this reason, the second twist direction of the aramid primarily twisted yarns is the same as the first twist direction of the nylon primarily twisted yarns and the third twist direction (that is, secondary twisting direction) is opposite to the first twist direction.

According to the present invention, because primary twisting and secondary twisting are conducted by one twister, production efficiency of the hybrid tire cord can be improved and manufacturing costs can be reduced.

Meanwhile, according to the present invention, although primary twisting and secondary twisting are conducted by one twister, regarding a predetermined length of the hybrid tire cord, after the secondary twist is untwisted, the length of the aramid primarily twisted yarn is 1.005 to 1.025 times the length of the nylon primarily twisted yarn. That is, the hybrid tire cord of the present invention has a merge structure having a partial covering structure.

Accordingly, unlike a hybrid tire cord having a merge structure in which nylon primarily twisted yarns and aramid primarily twisted yarns have substantially identical length and identical structure (that is, after untwisting of secondary twisting, the length of the aramid primarily twisted yarn is 1.005 times lower than the length of the nylon primarily twisted yarn), in the hybrid tire cord of the present invention, stress applied to a hybrid tire cord upon repeated tension/compression of a tire can be dispersed to not only the aramid primarily twisted yarn, but also the nylon primarily twisted yarn. As a result, the hybrid tire cord of the present invention having superior fatigue resistance can maintain stability of tires even upon rapid driving for a long time.

Meanwhile, when the length of the aramid primarily twisted yarns after untwisting of secondary twisting exceeds 1.025 times the length of nylon primarily twisted yarns, the hybrid tire cord has a similar unstable structure to the covering structure of the prior art, thus increasing deviation of physical properties and defect rate during manufacture for the aforementioned reasons and tire defect rate due to deviation of physical properties during tire manufacture.

According to an embodiment of the present invention, the aramid primarily twisted yarn of the hybrid tire cord has lower a twist number than that of the nylon primarily twisted yarn. For example, the twist number of aramid primarily twisted yarns may be 0.1 to 5% lower than that of the nylon primarily twisted yarns.

Because the twist number of primary twisting of aramid filament yarns is much less than the twist number of primary twisting of aramid (which is much greater than the twist number of primary twisting of nylon) in the covering structure of the prior art, the hybrid tire cord of the present invention has less deterioration in strength of aramid. That is, in the process of manufacturing the hybrid tire cord, relatively high strength of aramid can be maintained and the hybrid tire cord of the present invention can minimize deformation of tires during high-speed driving tire owing to high strength of aramid.

The nylon used for manufacturing the hybrid tire cord of the present invention contains a highly polar amide group in a main chain and is crystalline due to tacticity and chirality thereof. Nylon is common nylon 6, nylon 66, or nylon 6.10, preferably nylon 66.

The nylon filament yarn used for manufacturing the hybrid tire cord of the present invention is not particularly limited and has preferably a fineness of 400 to 3000 denier, tensile strength of 8 g/d or higher, and a breaking elongation of 17% or higher. When the nylon filament yarn has a tensile strength less than 8 g/d, movement of belts during vehicle running cannot be sufficiently prevented, or when a great amount of cords is used to prevent this phenomenon, weight of tires is increased. When breaking elongation of the nylon filament yarn is less than 17%, serious strength deterioration resulting from repetition of tension/compression of tires occurs due to bad fatigue resistance of tire cords.

Aramid contains an amide group and a phenyl group in a main chain and thus has a modulus 10 times or higher than nylon. Aramid is classified into para (p-) and meta (m-) aramid depending on bonding positions of a phenyl group and is preferably poly(p-phenylene terephthalamide) represented by the following Formula 1:

<Formula 1>

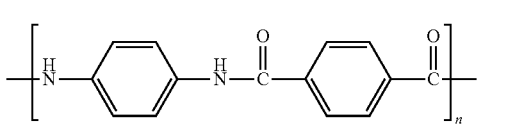

wherein n is determined depending on molecular weight of aramid and is not particularly limited in the present invention.

According to an embodiment of the present invention, the aramid filament yarn has a fineness of 400 to 3000 denier, a tensile strength of 20 g/d or higher and a breaking elongation of 3% or higher. When the tensile strength of the aramid filament yarn is less than 20 g/d, low strength of nylon filament yarn cannot be sufficiently compensated for and there is thus an increased risk of causing tire deformation during high-speed driving.

In the hybrid tire cord according to an embodiment of the present invention, the weight ratio of nylon primarily twisted yarns to aramid primarily twisted yarns is 20:80 to 80:20.

When the weight of nylon primarily twisted yarns exceeds 4 times the weight of aramid primarily twisted yarns, physical properties of finally obtained hybrid tire cords become similar to those of nylon and flat spots thus occur. On the other hand, if the weight of aramid primarily twisted yarns exceeds 4 times the weight of nylon primarily twisted yarns, strength of hybrid tire cords is improved, but shrinkage is lowered and movement of belts during vehicle running cannot be sufficiently prevented, it is difficult to secure durability of tires due to deteriorated fatigue resistance, and costs are increased due to use of great amount of expensive aramid.

The hybrid tire cord according to an embodiment of the present invention may further include an adhesive agent coated on the nylon primarily twisted yarn and the aramid primarily twisted yarn in order to improve adhesivity to tires and strength at break, elongation at break measured by ASTM D885 may be 8.0 to 15.0 g/d and 7 to 15%, respectively, and strength maintenance percentage after disk fatigue test conducted by JIS-L 1017 of Japanese Standard Association (JSA) may be 90% or higher. In addition, the hybrid tire cord may have 3% LASE, 5% LASE, and 7% LASE measured by ASTM D885 of 0.8 to 2.0 g/d, 1.5 to 4.0 g/d, and 3.0 to 6.0 g/d, respectively. The hybrid tire cord may have a shrinkage of 1.5 to 2.5%, wherein the shrinkage is measured under a primary load of 0.01 g/denier at 180° C. for 2 minutes.

Hereinafter, the method for manufacturing the hybrid tire cord of the present invention as mentioned above will be described in more detail.

Both aramid filament yarns having a fineness of 400 to 3,000 denier and nylon filament yarns having a fineness of 400 to 3,000 denier are introduced into a cable cord twister for conducting both primary twisting and secondary twisting. In the twister, a first step of primary twisting an aramid filament yarn in a first direction to form an aramid primarily twisted yarn and a second step of primary twisting a nylon filament yarn in a second direction to form a nylon primarily twisted yarn are simultaneously conducted, and a third step of secondary twisting the aramid primarily twisted yarn and the nylon primarily twisted yarn in a third direction to form a plied yarn is continuously conducted with the first and second steps. As described above, the second direction is the same as the first direction and the third direction is opposite to the first direction.

According to the present invention, because a plied yarn is produced by a continuous process of conducting both primary twisting and secondary twisting in one twister, production efficiency of hybrid tire cord can be improved, as compared to a conventional batch process of conducting primary twisting of nylon filament yarns and aramid filament yarns in separate twisters and then conducting secondary twisting using another twister.

According to the present invention, tension applied to the aramid filament yarn in the second step is greater than tension applied to the nylon filament yarn in the first step. Accordingly, although primary twisting and secondary twisting are conducted by one twister, the length of the aramid primarily twisted yarn after untwisting of secondary twisting in the hybrid tire cord with a predetermined length may be slightly longer than that of the nylon primarily twisted yarn. As a result, stress applied to the hybrid tire cord during repetition of tension/compression of the tire can be dispersed to not only the aramid primarily twisted yarn, but also to nylon primarily twisted yarn and the hybrid tire cord can maintain stability of the tire even during driving due to superior fatigue resistance.

In addition, because tension applied to the nylon filament yarn is higher than tension applied to the aramid filament yarn, although one twist number of primary twisting and secondary twisting is set at the twister, the twist number of the aramid primarily twisted yarn may be slightly different from the twist number of the nylon primarily twisted yarn.

According to an embodiment of the present invention, tension applied to the nylon filament yarn in the second step is higher than tension applied to the aramid filament yarn in the first step and the difference therebetween may make the length of the aramid primarily twisted yarn 1.005 to 1.025 times the length of the nylon primarily twisted yarn after untwisting of secondary twisting with respect to the hybrid tire cord with a predetermined length (that is, after untwisting of the plied yarn).

The levels of tension applied to the nylon filament yarn and the aramid filament yarn can be controlled by suitably setting revolutions per minute (rpm) of rolls of the twister.

In an embodiment related to production of a dip cord, not a raw cord, dipping the plied yarn in an adhesive agent solution, drying the adhesive agent solution-impregnated plied yarn and thermally treating the dried plied yarn may be continuously conducted in order to improve adhesivity to tires.

A resorcinol formaldehyde Latex (RFL) solution, an epoxy adhesive solution or the like can be used as the adhesive agent solution.

The drying temperature and time of the adhesive agent solution may be changed according to composition and the drying is commonly at 100 to 200° C. for 30 to 120 seconds.

The thermal treatment may be conducted at 200 to 250° C. for 30 to 120 seconds.

Meanwhile, although the twister is set to conduct the same twist number of primary twisting and secondary twisting, in the process of dipping and then drying the plied yarn produced by the twister, untwisting may occur. In order to prevent this phenomenon, in the continuously conducted dipping, drying and thermal treatment steps, tension applied to the plied yarn is preferably 0.4 g/d or less per cord.

Hereinafter, the present invention will be described in more detail with reference to the following examples and comparative Examples. The following examples are only given for better understanding of the present invention and should not be construed as limiting the scope of the present invention.

Production of Plied Yarn (Raw Cord)

EXAMPLE 1

A nylon filament yarn having a fineness of 1,260 denier and an aramid filament yarn having a fineness of 1,500 denier were introduced into a cable cord twister and Z-direction of primary twisting and S-direction of secondary twisting were simultaneously conducted to produce a 2-ply yarn. At this time, the cable cord twister was set to a twist number of 300 TPM for primary twisting and secondary twisting, and tension applied to the nylon filament yarn was 52%, and tension applied to the aramid filament yarn was 2.5 position in the production.

EXAMPLE 2

A plied yarn was produced in the same manner as in Example 1, except that the tension applied to the nylon filament yarn was 52% and the tension applied to the aramid filament yarn was 2.25 position.

EXAMPLE 3

A plied yarn was produced in the same manner as in Example 1, except that the tension applied to the nylon filament yarn was 52% and the tension applied to the aramid filament yarn was 2.0 position.

EXAMPLE 4

A plied yarn was produced in the same manner as in Example 1, except that the tension applied to the nylon filament yarn was 52% and the tension applied to the aramid filament yarn was 1.5 position.

COMPARATIVE EXAMPLE 1

A plied yarn was produced in the same manner as in Example 1, except that the tension applied to the nylon filament yarn was 52% and the tension applied to the aramid filament yarn was 3.25 position.

COMPARATIVE EXAMPLE 2

A plied yarn was produced in the same manner as in Example 1, except that the tension applied to the nylon filament yarn was 52% and the tension applied to the aramid filament yarn was 2.75 position.

COMPARATIVE EXAMPLE 3

A plied yarn was produced in the same manner as in Example 1, except that the tension applied to the nylon filament yarn was 52% and the tension applied to the aramid filament yarn was 0.75 position.

Regarding plied yarns respectively produced in Example 1 to 4 and Comparative Example 1 to 3, a ratio of length of aramid primarily twisted yarn to length of nylon primarily twisted yarn was obtained by the following method and results are shown in Table 1.

Ratio of Length of Aramid Primarily Twisted Yarn to Length of Nylon Primarily Twisted Yarn A load of 0.05 g/d was applied to a 25 cm length plied yarn sample to untwist secondary twists and separate them from each other. Then, first, a nylon primarily twisted yarn was removed by cutting, the length of aramid primarily twisted yarn to which a load of 0.05 g/d was applied was measured, untwisting of the secondary twists was repeated, the aramid primarily twisted yarn was removed by cutting, and the length of nylon primarily twisted yarn to which a load of 0.05 g/d was applied was measured. A ratio of length of aramid primarily twisted yarn to length of nylon primarily twisted yarn was calculated by the following Equation 1:

$$R = La/Ln \qquad \text{<Equation 1>}$$

wherein R is a ratio of a length of an aramid primarily twisted yarn to a length of a nylon primarily twisted yarn, La is a length of an aramid primarily twisted yarn, and Ln is a length of a nylon primarily twisted yarn.

TABLE 1

|  | Aramid tension (position) | Nylon tension (%) | Aramid primarily twisted yarn length/nylon primarily twisted yarn length |
|---|---|---|---|
| Example 1 | 2.5 | 52 | 1.005 |
| Example 2 | 2.25 | 52 | 1.01 |
| Example 3 | 2.0 | 52 | 1.02 |
| Example 4 | 1.5 | 52 | 1.025 |
| Comparative Example 1 | 3.25 | 52 | 1 |
| Comparative Example 2 | 2.75 | 52 | 1.003 |
| Comparative Example 3 | 0.75 | 52 | 1.03 |

Production of Dip Cord

EXAMPLE 5

2-ply yarn of Example 1 was dipped in a resorcinol-formaldehyde-latex (RFL) adhesive agent solution containing 2.0 wt % of resorcinol, 3.2 wt % of formalin (37%), 1.1 wt % of sodium hydroxide (10%), 43.9 wt % of styrene/butadiene/vinyl pyridine (15/70/15) rubber (41%), and water. The 2-ply yarn containing the RFL solution introduced by dipping was dried at 150° C. for 100 seconds and thermally treated at 240° C. for 100 seconds to complete a dip cord. Tension applied to the 2-ply yarn in the dipping, drying and thermal treatment processes was controlled to 0.5 kg/cord.

EXAMPLES 6 to 8

Dip cords were produced in the same manner as in Example 5, except that plied yarns of Examples 2 to 4 were used, instead of 2-ply yarn of Example 1.

COMPARATIVE EXAMPLES 4 to 6

Dip cords were produced in the same manner as in Example 5, except that plied yarns of Comparative Examples 1 to 3 were used, instead of 2-ply yarn of Example 1.

Strength at break and non-uniformity thereof, elongation at break and non-uniformity thereof, shrinkage, and disk fatigue characteristics of dip cords obtained by Examples 5 to 8 and Comparative Examples 4 to 6 were measured by the following methods and results are shown in Table 2.

Strength at Break and Non-Uniformity Thereof & Elongation at Break and Non-Uniformity Thereof Strength at break and elongation at break of the dip cord were measured using an Instron tester (Engineering Corp., Canton, Mass.) by applying a tensile speed of 300 m/min to ten 250 mm samples in accordance with the ASTM D-885 test method. Subsequently, strength at break (g/d) of each sample was obtained by dividing strength at break of each sample by the total fineness of the dip cord. Subsequently, averages of strength at break and elongation at break of ten samples were calculated to obtain strength at break and elongation at break of the dip cord.

Meanwhile, the differences in maximum and minimum between strengths at break of ten samples were calculated and the differences in maximum and minimum between elongations at break of the samples were calculated to obtain non-uniformity of strength at break and non-uniformity of elongation at break of the dip cord.

Shrinkage (%)

Shrinkage was measured using Testrite equipment under a primary load of 0.01 g/De at 180° C. for 2 minutes after allowing to stand under atmospheric conditions of a temperature of 25° C. and a relative humidity of 65% for 24 hours or longer.

Disk Fatigue Characteristics

The hybrid tire cord, strength (strength before fatigue) of which had been measured, was vulcanized to a rubber to produce a sample and tension and compression were repeated for 16 hours within the range of ±2% and +3/−10% while rotating at 80° C. and at a speed of 2,500 rpm using a disk fatigue tester in accordance with JIS-L 1017 of Japanese Standard Association (JSA), to apply fatigue to the sample. Then, the rubber was removed from the sample and strength after fatigue of the hybrid tire cord was measured. Strength maintenance percentage defined by the following Equation 2 was calculated based on strength before fatigue and strength after fatigue:

Strength maintenance percentage (%)=[strength after fatigue (kgf)/strength before fatigue (kgf)]×100  <Equation 2> wherein strength before fatigue and strength after fatigue (kgf) are obtained by measuring strength at break of the hybrid tire cord while applying a tensile speed of 300 m/min to a 250 mm sample using an Instron tester (Instron Engineering Corp., Canton, Mass.) in accordance with ASTM D-885.

Bending Fatigue Characteristics

Bending fatigue test, which is a simulated test of tension/compression/shearing deformation which occurs during tire driving, was used. A 0.6 mm rubber was stacked on two cord layers, i.e., upper and lower cord layers, with a gap of 25 EPI (End per Inch) such that the total thickness reaches 5 mm, vulcanized at 160° C. for 20 minutes to produce a sample and a warp yarn direction of width was cut to 1 inch to produce a fatigue test sample. At this time, a load of 68 kgf was repeatedly applied 37500 cycles at a spindle of 0.5 inches at room temperature, 10 cords were then collected and strength after fatigue of the cords was measured. At this time, strength before fatigue and strength after fatigue (kgf) were obtained by measuring strength at break of the hybrid tire cord while applying a tensile speed of 300 m/min to a 250 mm sample using an Instron tester (Instron tester Engineering Corp., Canton, Mass.) in accordance with ASTM D-885.

TABLE 2

|  | Example 5 | Example 6 | Example 7 | Example 8 | Comparative Example 4 | Comparative Example 5 | Comparative Example 6 |
| --- | --- | --- | --- | --- | --- | --- | --- |
| Aramid primarily twisted yarn length/nylon primarily twisted yarn length | 1.005 | 1.01 | 1.02 | 1.025 | 1 | 1.003 | 1.03 |
| Strength at break (g/d) | 13.4 | 13.5 | 13.9 | 13.1 | 13.7 | 12.8 | 12.6 |
| Strength at break non-uniformity (g/d) | 0.3 | 0.4 | 0.4 | 0.4 | 0.3 | 0.3 | 6.5 |
| Elongation at break (%) | 11.0 | 11.3 | 11.8 | 11.9 | 10.8 | 10.8 | 12.5 |
| Elongation at break non-uniformity (%) | 1.6 | 1.8 | 1.8 | 2.0 | 1.4 | 1.6 | 4.0 |
| Shrinkage (%) | 2.0 | 2.1 | 2.1 | 2.0 | 2.5 | 2.0 | 2.0 |
| Disk fatigue ±2% strength maintenance percentage (%) | 96 | 96 | 98 | 95 | 87.9 | 92 | 94.5 |
| Disk fatigue +3/−10% strength maintenance percentage (%) | 90.5 | 91.6 | 92.5 | 93.1 | 78.5 | 80.2 | 82.4 |
| Bending fatigue strength maintenance percentage (%) | 91.3 | 93.1 | 96.0 | 92.0 | 75.1 | 86.4 | 85.2 |

It can be seen that Examples 5 to 8 exhibit superior uniformity of physical properties, exhibit superior fatigue resistance because stress applied to the hybrid tire cord during repetition of tension/compression of the tire can be dispersed to not only the aramid primarily twisted yarn but also the nylon primarily twisted yarn, in particular, exhibit superior fatigue resistance when tension/compression deformation is serious, and maintain superior fatigue resistance when tension/compression/shearing is repeatedly applied upon actual tire driving.

On the other hand, it can be seen that Comparative Example 4 exhibits uniformity of physical properties, but it is difficult to secure stability of the cord because stress is intensely applied to the aramid primarily twisted yarn upon repeated tension and compression of the tire and characteristics of the tire cord are bad. Comparative Example 5 has a difficulty in securing fatigue resistance despite of long aramid primarily twisted yarn, and Comparative Example 6 has covering-type hybrid properties due to excessively long aramid primarily twisted yarn and thus deterioration in uniformity of physical properties and increased defect rate in manufacture of tires, and has post-fatigue maintenance percentage of 90% or higher when tension/compression deformation is small, or exhibits great deterioration in fatigue resistance strength when tension/compression is great or tension/compression/shearing is repeated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A hybrid tire cord comprising:
a nylon primarily twisted yarn; and
an aramid primarily twisted yarn,
wherein the nylon primarily twisted yarn and the aramid primarily twisted yarn are secondarily twisted together,
if the secondary twist of the hybrid tire cord with a predetermined length were untwisted, a length of the aramid primarily twisted yarn would be 1.005 to 1.025 times a length of the nylon primarily twisted yarn,
the aramid primarily twisted yarn has a 0.1 to 5% lower twist number than a twist number of the nylon primarily twisted yarn, and
the hybrid tire cord has a merge structure having a partial covering structure.

2. The hybrid tire cord according to claim 1, wherein the nylon primarily twisted yarn has a first twist direction,
the aramid primarily twisted yarn has a second twist direction,
the nylon primarily twisted yarn and the aramid primarily twisted yarn are secondarily twisted together in a third twist direction,
the second twist direction is the same as the first twist direction, and
the third twist direction is opposite to the first twist direction.

3. The hybrid tire cord according to claim 1, wherein a weight ratio of the nylon primarily twisted yarn to the aramid primarily twisted yarn is 20:80 to 80:20.

4. The hybrid tire cord according to claim 1, further comprising an adhesive agent coated on the nylon primarily twisted yarn and the aramid primarily twisted yarn,
wherein strength at break and elongation at break measured by ASTM D885 (2004) are 8.0 to 15.0 g/d and 7 to 15%, respectively, and
a strength maintenance percentage after disk fatigue test conducted by JIS-L 1017 (2008) of Japanese Standard Association (JSA) is 90% or higher.

5. The hybrid tire cord according to claim 4, wherein the hybrid tire cord has 3% LASE, 5% LASE, and 7% LASE measured by ASTM D885 (2004), of 0.8 to 2.0 g/d, 1.5 to 4.0 g/d, and 3.0 to 6.0 g/d, respectively.

6. The hybrid tire cord according to claim 5, wherein the hybrid tire cord has a shrinkage of 1.5 to 2.5%,
wherein the shrinkage is measured under a primary load of 0.01 g/denier at 180° C. for 2 minutes.

* * * * *